US011645304B2

(12) United States Patent
Mallya et al.

(10) Patent No.: US 11,645,304 B2
(45) Date of Patent: *May 9, 2023

(54) SANITIZING DATABASE STRUCTURES FOR TESTING (71) Applicant: ZenPayroll, Inc., San Francisco, CA (US)

(72) Inventors: Vaibhav Mallya, San Francisco, CA (US); Nikhil Mathew, San Francisco, CA (US)

(73) Assignee: ZENPAYROLL, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/461,960

(22) Filed: Aug. 30, 2021

(65) Prior Publication Data

US 2021/0390116 A1 Dec. 16, 2021

Related U.S. Application Data (63) Continuation of application No. 16/041,583, filed on Jul. 20, 2018, now Pat. No. 11,138,225.

(51) Int. Cl.
G06F 16/27 (2019.01)
G06F 21/62 (2013.01)
G06F 16/16 (2019.01)
G06F 16/21 (2019.01)
(Continued)

(52) U.S. Cl.
CPC ............. *G06F 16/27* (2019.01); *G06F 16/16* (2019.01); *G06F 16/211* (2019.01); *G06F 16/2282* (2019.01); *G06F 21/6227* (2013.01); *G06F 16/284* (2019.01)

(58) Field of Classification Search
CPC ...... G06F 16/27; G06F 16/16; G06F 16/2282; G06F 16/211; G06F 21/6227; G06F 16/84
See application file for complete search history.

(56) References Cited

U.S. PATENT DOCUMENTS

2004/0210890 A1 10/2004 Armstrong et al.
2010/0250497 A1 9/2010 Redlich et al.
2012/0210007 A1 8/2012 Ormazabal et al.
(Continued)

OTHER PUBLICATIONS

United States Office Action, U.S. Appl. No. 16/041,583, filed Jul. 2, 2020, 26 pages.
(Continued)

*Primary Examiner* — Ashish Thomas
*Assistant Examiner* — Dustin D Eyers
(74) *Attorney, Agent, or Firm* — Fenwick & West LLP (57) ABSTRACT A central database system allows users to access and use data stored in a relational database. In order to ensure that the stored data is not detrimentally impacted and that the security of the stored data is maintained, the central database system generates a sanitized copy of the database. The central database system stores and accesses annotation files associated with data tables of the database and a schema identifying the structure of the database. Based on the schema, for each data table, the central database system validates the annotation file. A copy of the data table is created and sanitized corresponding to the annotation file. The sanitized copies of the data tables are used to generate a sanitized copy of the database. The sanitized copy of the database may then be accessed and used by users of the central database system without impacting the relational database.

20 Claims, 6 Drawing Sheets (51) Int. Cl.
*G06F 16/22* (2019.01)
*G06F 16/28* (2019.01)

(56) References Cited

U.S. PATENT DOCUMENTS

2012/0255030 A1 10/2012 Matsuo
2012/0323753 A1 12/2012 Norman et al.
2014/0359232 A1 12/2014 Holbrook et al.
2015/0058337 A1 2/2015 Gordon et al.
2017/0094541 A1 3/2017 Ngai
2019/0147182 A1 5/2019 Arora et al.

OTHER PUBLICATIONS

United States Office Action, U.S. Appl. No. 16/041,583, filed Nov. 12, 2020, 30 pages.
United States Office Action, U.S. Appl. No. 16/041,583, filed Feb. 23, 2021, 33 pages.

Sanitized View Table 330

| Owner First Name | Phone Number | Pet Name | Date of Last Visit |
|---|---|---|---|
| Ryan | 111-111-1111 | Affogato | 4/5/2018 |
| Greg | 222-222-2222 | Waffles | 5/1/2018 |
| Bri | 333-333-3333 | Rook | 6/20/2017 |
| Bri | 444-444-4444 | Starbuck | 6/20/2017 |
| Rosemary | 555-555-5555 | Nathan | 10/7/2017 |
| Toney | 666-666-6666 | Arfie | 11/3/2017 |
| Joey | 777-777-7777 | August | 2/23/2018 |
| Emily | 888-888-8888 | Piper | 1/2/2018 |

Logic Model 340

```
// Sort by
date of last
visit & flag
clients that
have not
visited in 6
months. //
```

Logic Model Output 350

| Owner First Name | Phone Number | Pet Name | Date of Last Visit | Flag |
|---|---|---|---|---|
| Bri | 333-333-3333 | Rook | 6/20/2017 | ✓ |
| Bri | 444-444-4444 | Starbuck | 6/20/2017 | ✓ |
| Rosemary | 555-555-5555 | Nathan | 10/7/2017 | ✓ |
| Toney | 666-666-6666 | Arfie | 11/3/2017 | ✓ |
| Emily | 888-888-8888 | Piper | 1/2/2018 | |
| Joey | 777-777-7777 | August | 2/23/2018 | |
| Ryan | 111-111-1111 | Affogato | 4/5/2018 | |
| Greg | 222-222-2222 | Waffles | 5/1/2018 | |

SANITIZING DATABASE STRUCTURES FOR TESTING

CROSS REFERENCE TO RELATED APPLICATIONS

This application is a continuation of U.S. application Ser. No. 16/041,583, filed on Jul. 20, 2018, now U.S. Pat. No. 11,138,225, which is incorporated herein by reference in its entirety for all purposes.

TECHNICAL FIELD

This disclosure relates generally to the sanitization of database structures, and more specifically to identifying sensitive data using annotation files to sanitize database structures for testing and development purposes.

BACKGROUND

Central database structures are used to store data tables accessed and used by one or more applications. Source code runs across all applications. Changes to the source code, such as for testing purposes, may impact the central database in unpredictable ways, including overwriting, deleting, or otherwise altering the included data. Additionally, the central database may include sensitive information that requires sanitization prior to being used for testing or other purposes. There is a need for a sanitization process that allows users of the central database to access and use the stored data without detrimentally impacting the database or the security of the stored data.

SUMMARY

A central database system generates a sanitized copy of a central database, allowing users to access and use the data within the database without impacting the source data or security of the database. The central database system stores and accesses annotation files identifying sensitive information that requires sanitization. The annotation files correspond to data tables in the database. The central database system additionally accesses a schema for the database that identifies the structure of the database. For each data table in the database, the central database system creates a copy of the data table and validates the annotation file associated with the data table based on the schema for the database. The copy of the data table is sanitized based on the validated annotation file. The central database system creates a sanitized copy of the database using the sanitized copies of data tables. The sanitized copy of the database may then be accessed by users of the central database system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
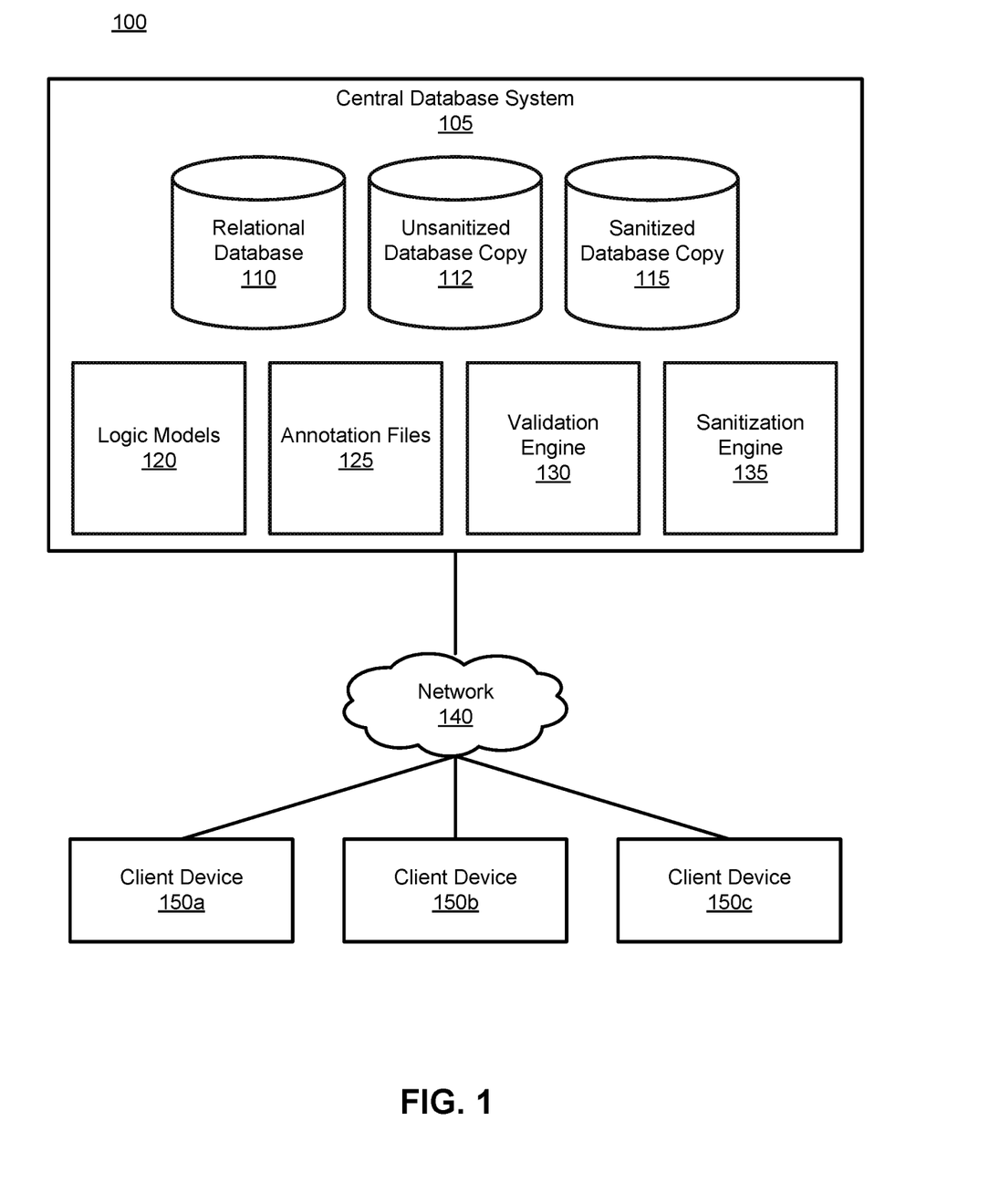
FIG. 1 is a block diagram of a system environment in which a central database system operates, in accordance with an embodiment.

FIG. 1 is a block diagram of a system environment 100 for a central database system 105. The system environment 100 shown by FIG. 1 comprises the central database system 105, a network 140, and one or more client devices 150. In alternative configurations, different and/or additional components may be included in the system environment 100.

The central database system 105 stores and maintains a relational database 110 and related modules to organize and store data within the relational database, and to manage access to the stored data. In one embodiment, the central database system 105 operates on a central computer or database system, such as a server or set of servers operating within a datacenter. The central database system 105 is configured to communicate with a network 140 and may be accessed by client devices 150 via the network. The central database system 105 shown in FIG. 1 includes a relational database 110, an unsanitized database copy 112, a sanitized database copy 115, logic models 120, annotation files 125, a validation engine 130, and a sanitization engine 135. In other embodiments, the central database system 105 may contain additional, fewer, or different components for various applications. Conventional components such as network interfaces, security functions, load balancers, failover servers, management and network operations consoles, and the like are not shown so as to not obscure the details of the system architecture.

The relational database 110 stores and maintains data for the central database system 105. Various types of data may be stored in the relational database 110. For example, data may include financial transaction data, personally identifiable information ("PIT"), healthcare records, user data (for instance, describing a user's actions or communications within a network), social media data, sensor data, and the like. Some or all of the data stored in the relational database 110 may be sensitive or high-risk information, such as social security numbers, phone numbers, full names of individuals, and addresses of individuals. Data stored in the relational database 110 is organized into one or more data tables including uniquely identified rows and columns. The relational database 110 is associated with a schema identifying the structure of the database. The schema identifies the data tables, rows, and columns included in the relational database 110. In some embodiments, the schema further identifies types of data, categories of data, or data sensitivity levels in columns of the relational database 110.

The unsanitized database copy 112 is a copy of the relational database 110 made prior to performing sanitization operations on the data within the relational database. The sanitized database copy 115 is generated by performing the sanitization operations on the unsanitized database copy 112, and thus is a copy of the relational database 110 with sensitive information protected. The unsanitized database copy 112 and the sanitized database copy 115 can be stored within a database, a memory, or another non-transitory computer-readable storage medium. In some embodiments, the unsanitized database copy 112 and the sanitized database copy 115 are stored within the same memory or medium. For instance, the unsanitized database copy 112 can be stored within a memory, and can be transformed into the sanitized database copy 115 by performing sanitization operations directly on the unsanitized database copy.

In one embodiment, the unsanitized database copy 112 comprises a copy of the entire database, and thus the sanitized database copy 115 includes the database with portions of the database identified as sensitive protected via the sanitization processed described herein. In other embodiments, each data table in the relational database 110 is sanitized individually (for instance, each data table can be copied to the unsanitized database copy 112, and can be added to the sanitized database copy 115 upon the performance of sanitization operations). For instance, all data tables stored within the relational database 110 can be individually protected using the sanitization process described herein, or a subset of such data tables (such as data tables identified as mostly likely to be accessed, data tables queried by a user or process, data tables corresponding to a set of logic models being tested, or any or combination of less-than-all data tables stored within the relational database 110) are copied to the unsanitized database copy 112 before being protected and stored within the sanitized database copy 115. The data tables in the sanitized database copy can be organized similarly to the corresponding data tables in the relational database. Data within the sanitized database copy 115 that is identified as sensitive and sanitized during the sanitization process is flagged to indicate that the data is sanitized. In one embodiment, all or part of the sanitized database copy 115 is compressed for transmission to client devices 150 or to generally reduce the storage footprint of the sanitized database copy.

The logic models 120 include instructions for accessing and using data included within the relational database 110. In one embodiment, logic models 120 are created and stored on the central database system 105 by users of the central database system. In some embodiments, logic models 120 comprise executable software files, scripts, or sets of instructions that perform a set of operations on data within the relational database 110. For instance, a logic model may correspond to a particular application feature, a web portal interface, a backend database administrator auditing tool, and the like. As logic models 120 operate on data within the relational database, testing such logic models is important to ensuring the proper functionality or performance of the logic model. However, allowing users testing the logic models to test on unprotected data within the relational database might create a security risk. Thus, by enabling the testing of such logic models 120 on sanitized copies of data tables within the relational database 110, the security risks that otherwise might be associated with the testing of the logic models can be mitigated.

Logic models 120 may be used to access and/or modify data in the relational database 110 or in the sanitized database copy 115. For example, a logic model 120 can include a set of SQL instructions that identify a data table corresponding to the logic model (such as a table mapping healthcare patients to their age and date of last checkup) and stored within the relational database 110. The logic model can further include a set of instructions that order data within the data table, for instance ordering patients by age or including patients that are overdue for a checkup at the top. Logic models 120 may include further instructions to alter data within a corresponding data table, for instance by sorting data, updating data, inserting data, deleting data, modifying data using one or more math functions, and the like. Additionally, logic models 120 may include instructions for identifying and outputting information stored in the relational database 110 for use in downstream operations. Because the logic models 120 are able to access and modify data stored by the central database, the testing of logic models 120 being developed or updated by users is performed on the sanitized database copy 115.

The annotation files 125 include information describing one or more data protection operations to perform on various portions of data included within the data tables of the relational database 110 in order to sanitize sensitive data. In one embodiment, an annotation file 125 is created and stored for each data table in the relational database 110. For instance, an annotation file can be uploaded to the central database system 105 in response to the uploading of a corresponding logic model 120 or the uploading of a corresponding data table to the relational database 110. In some embodiments, the central database system 105 can require a user uploading a logic model or data table to also upload an annotation file, and can reject requests or attempts to do so until a corresponding annotation file is also provided. In some embodiments, the central database system 105 can create a default annotation file each time a logic model or data table is uploaded to the central database system 105, and can include an identification of sanitization operations to perform on each column of data described by the annotation file based on an analysis of a type of data within the columns, based on a default set of sanitization operations, or based on an input from a system administrator. In some embodiments, the central database system 105 can prompt a user uploading a logic model or data table to the central database system to select one or more sanitization operations for inclusion in an automatically generated annotation file. In some embodiments, each logic model and/or data table stored by the central database system 105 is associated with at least one annotation file.

Each annotation file 125 includes information describing the columns included in a corresponding data table of the relational database 110. For example, an annotation file 125 may include identifiers associated with the data table and the columns of the data table, descriptions of the columns of the data table or the data within each column (e.g., data types), and metadata identifying fields of the data table as sensitive or in need of sanitation. The annotation files 125 can additionally describe various data protection operations to perform on one or more identified columns during sanitization of corresponding data tables. Example data protection operations include but are not limited to: obfuscating data with a set value (e.g., the character "X" or "0"), obfuscating data with random values, encrypting data using one or more encryption operations, nullifying data records, and modifying data using one or more mathematical functions. Annotation files 125 can identify sanitization operations based on the data type associated with various columns. For example, an annotation file can specify that all columns in a corresponding data table including integer values are to be replaced by randomly generated integer values.

The validation engine 130 accesses the schema describing the structure of the relational database 110. As previously described, the schema identifies data tables, columns, and rows in the relational database 110. Based on the schema, the validation engine 130 determines whether the database structure described by the schema correctly corresponds to the database structure described by the annotation files 125. For example, the validation engine 130 may identify a data table in the relational database 110 that does not correspond to an annotation file 115. Likewise, the validation engine 130 may identify a column of data included within a data table corresponding to an annotation file 115 that does not exist in the relational database 110 (e.g., a data column that has been deleted).

The validation engine 130 additionally determines whether the sanitized database copy 115 correctly flags data identified as sanitized by the annotation files 125. When a sanitized database copy 115 is generated by the sanitization engine 135, the validation engine 130 accesses the data stored in the sanitized database copy to determine whether the sanitization process has correctly identified, sanitized, and flagged sensitive information intended to be protected. For instance, if a particular annotation file 125 identifies a column of data that should be encrypted during sanitization, the validation engine 130 can identify the column of data within the sanitized database copy 115 and can determine whether the column was properly sanitized by determining if the column includes encrypted data or is flagged as encrypted. In a case where the validation engine 130 detects incorrectly sanitized or flagged data, the data can be flagged for further review by a human operator, can be excluded from queries that request the data, or can be re-sanitized by the sanitization engine 135.

The sanitization engine 135 implements a sanitization process on the relational database 110 using the annotation files 125 to produce a sanitized database copy 115. The sanitization process identifies sensitive information included in data tables in the relational database 110 and modifies or replaces the identified information, beneficially protecting the sensitive information from entities that access the sanitized database copy 115. In one embodiment, the sanitization engine 135 performs the sanitization process at periodic time intervals (e.g., every hour, once a day, etc.). In another embodiment, the sanitization engine 135 performs the sanitization process in response to a user request, such as a request from a database operator or manager, a request from a user implementing a logic model, or a request from a user via a client device 110. In yet another embodiment, the sanitization engine 135 performs the sanitization process in response to receiving an update to the relational database 110. For example, the sanitization process may be performed in response to receiving a new annotation file, receiving an updated annotation file, receiving a domain logic model, receiving a new relational database column, or receiving an update to an existing relational database column.

The client devices 150 are one or more computing devices capable of receiving user input as well as transmitting and/or receiving data via the network 150. In one embodiment, a client device 150 is a conventional computer system, such as a desktop or a laptop computer. Alternatively, a client device 150 may be a device having computer functionality, such as a personal digital assistant (PDA), a mobile telephone, a smartphone, or another suitable device. A client device 150 is configured to communicate with the central database system 105 via the network 140, for example using a native application executed by the client device 150 or through an application programming interface (API) running on a native operating system of the client device 150, such as IOS® or ANDROID™. In another example, the client device 150 is configured to communicate with the central database system 105 via an API running on the central database system.

The central database system 105 and the client devices 150 are configured to communicate via the network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

By generating a sanitized copy of the relational database 110, the central database system 105 allows users to access and use stored data without detrimentally impacting the source data of or security of the database. By utilizing the sanitized database copy 115, users (such as users that want to test new applications, code, or logic models) can access and modify stored data without risking the security of sensitive information or permanently changing the content or state of the stored data. The sanitized database copy 115 ensures that data in the relational database 110 is protected during testing that may affect the source data stored within the relational database 110.

Figure 2:
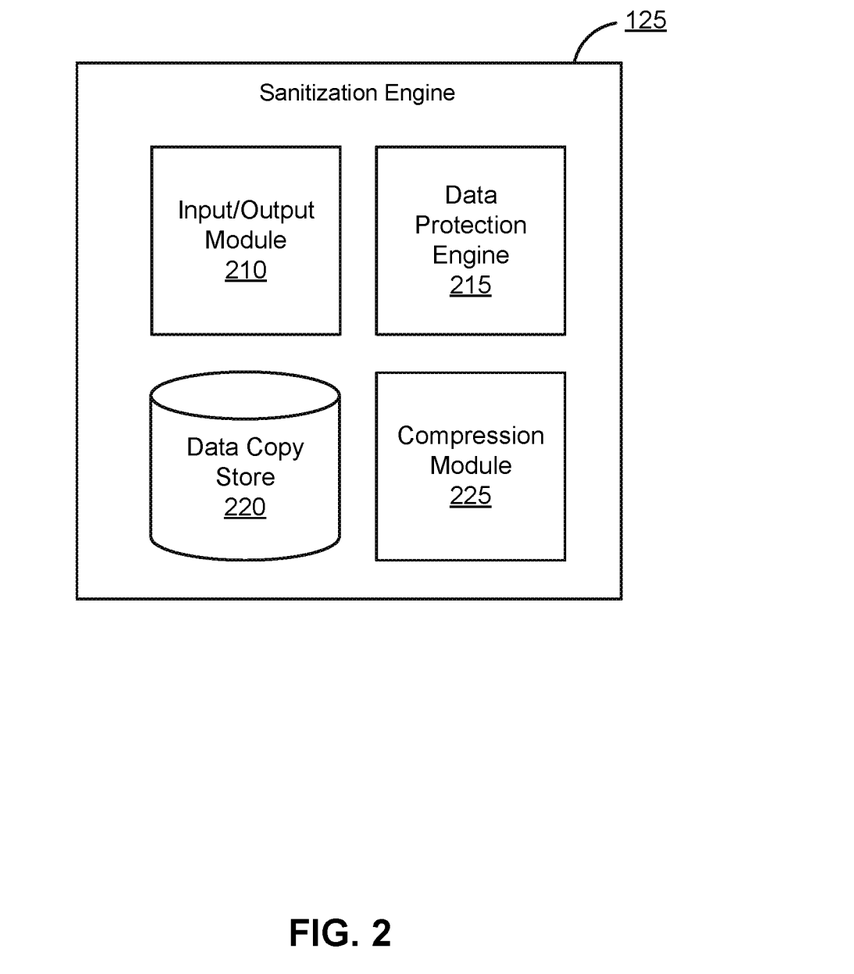
FIG. 2 is a block diagram of a sanitization engine, in accordance with an embodiment.

FIG. 2 is a block diagram of an architecture of the sanitization engine 135. The sanitization engine 135 shown in FIG. 2 includes an input/output module 210, a data protection engine 215, a data copy store 220, and a compression module 225. In other embodiments, the sanitization engine 135 may include additional, fewer, or different components for various applications.

The input/output module 210 accesses information for use in sanitizing the relational database 110. For instance, the input/output module 210 may access the entirety of or a subset of data included in the relational database 110, can access a schema describing the structure of the relational database 110, and can access annotation files 125 identifying sensitive information included in the relational database 110. Such data can be access and retrieved in response to a request from the data protection engine 215 (for instance, during the course of generating a sanitized copy of the relational database). The input/output module 210 can coordinate the transfer of information between modules of the sanitization engine, and can output sanitized information, for instance, for storage in the sanitized database copy 115.

The data protection engine 215 generates a copy of the relational database 110, accesses the database schema, accesses the annotation files 125 to identify sensitive information stored in the relational database, and sanitizes the identified sensitive information in the copy of the relational database. The data protection engine 215 generates an identical copy of all or part of the relational database 110 and stores the identical copy of the relational database in the data copy store 220. For each data table of the relational database 110, the data protection engine 215 validates the annotation file for the data table by determining that each column within the data table identified by the schema of the database corresponds to the column identified by the annotation file. Upon validation, the data protection engine 215 accesses and sanitizes the copy of the data table included in the copy of the relational database 110 using a sanitization operation.

The data protection engine 215 identifies sanitization operations or data protection operations specified for a particular set or column of data by the annotation file. For example, the annotation file can specify one or more of an encryption operation, a data nil operation, an obfuscation operation, a data replacement operation, and a data randomization operation, and can identify one or more columns of the corresponding data table on which to perform the specified sanitization operations. The annotation file can additionally identify a level of sensitivity associated with one or more columns within a corresponding data table, and the data protection engine 215 can perform one or more sanitization operations based on the identified level of sensitivity. The sanitized copy of data is transmitted to the data copy store 220 and replaces the corresponding version of the original copy of the relational database. The sanitization process is complete when the data protection engine 215 has sanitized each data table included in the data copy store 220.

The data copy store 220 stores copies of data from the relational database 110 during the sanitization process. In one embodiment, the data copy store 220 receives the data in data tables and maintains the organization described by the schema for the relational database 110. In one embodiment, the data copy store 220 receives sanitized copies of data tables from the data protection engine 215 throughout the sanitization process and updates the corresponding portion of the copied relational database 110. Upon receiving an instruction or notification that the data sanitization operations performed by the data protection engine 215 are complete, such that a copy of each data table of the relational database 110 is sanitized, the data copy store 220 transmits the stored sanitized copies of data to the compression module.

The compression module 225 compresses the sanitized copy of the relational database stored by the data copy store 220. The compressed sanitized copy is then outputted, for instance by the input/output module 210 for stored in the sanitized database copy 115.

Sanitizing Database Structures for Testing

Figure 3A:
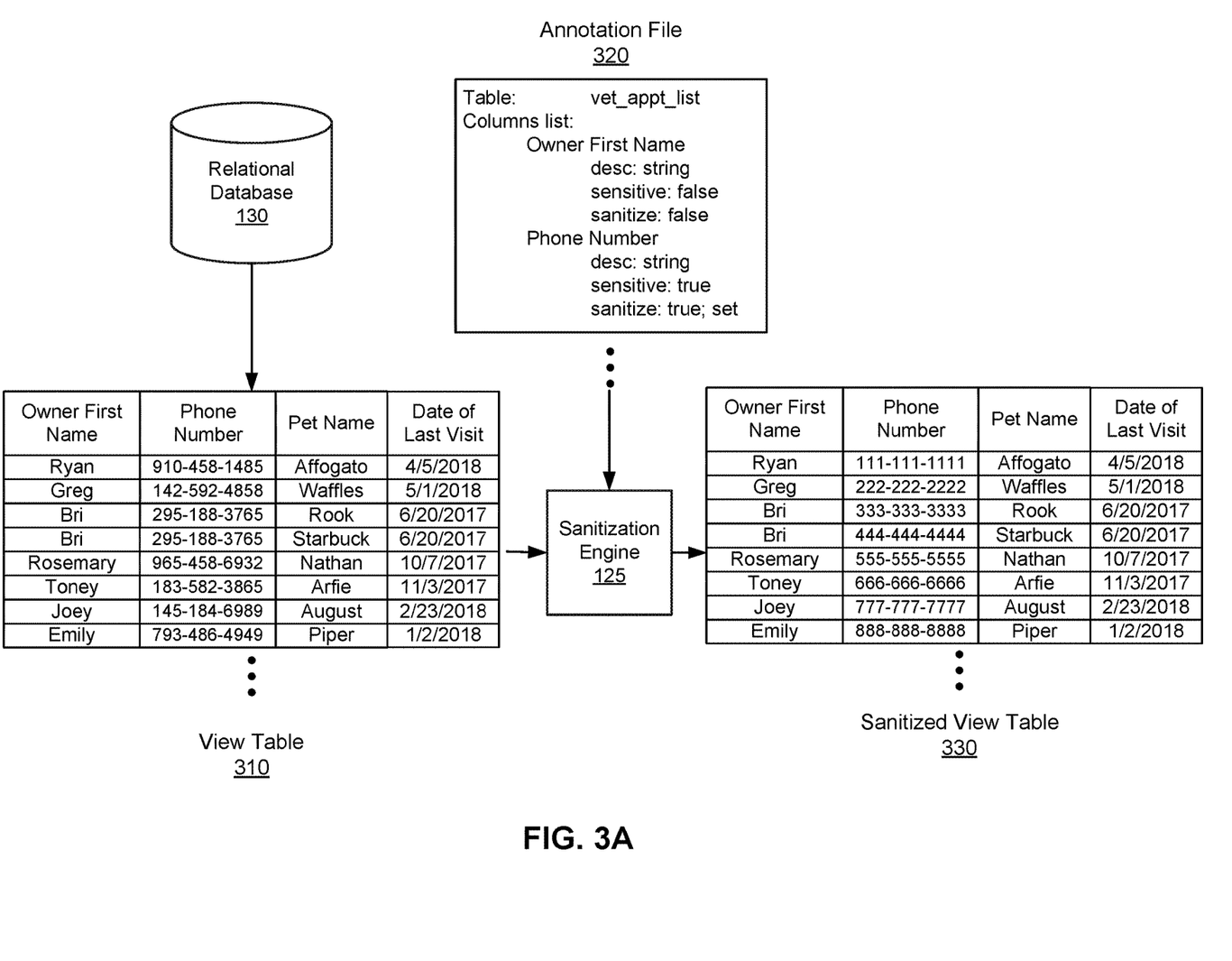
FIGS. 3A-3B illustrate an example of sanitizing a data table of a central database system and applying a logic model to the sanitized data table, in accordance with an embodiment.
Figure 3B:
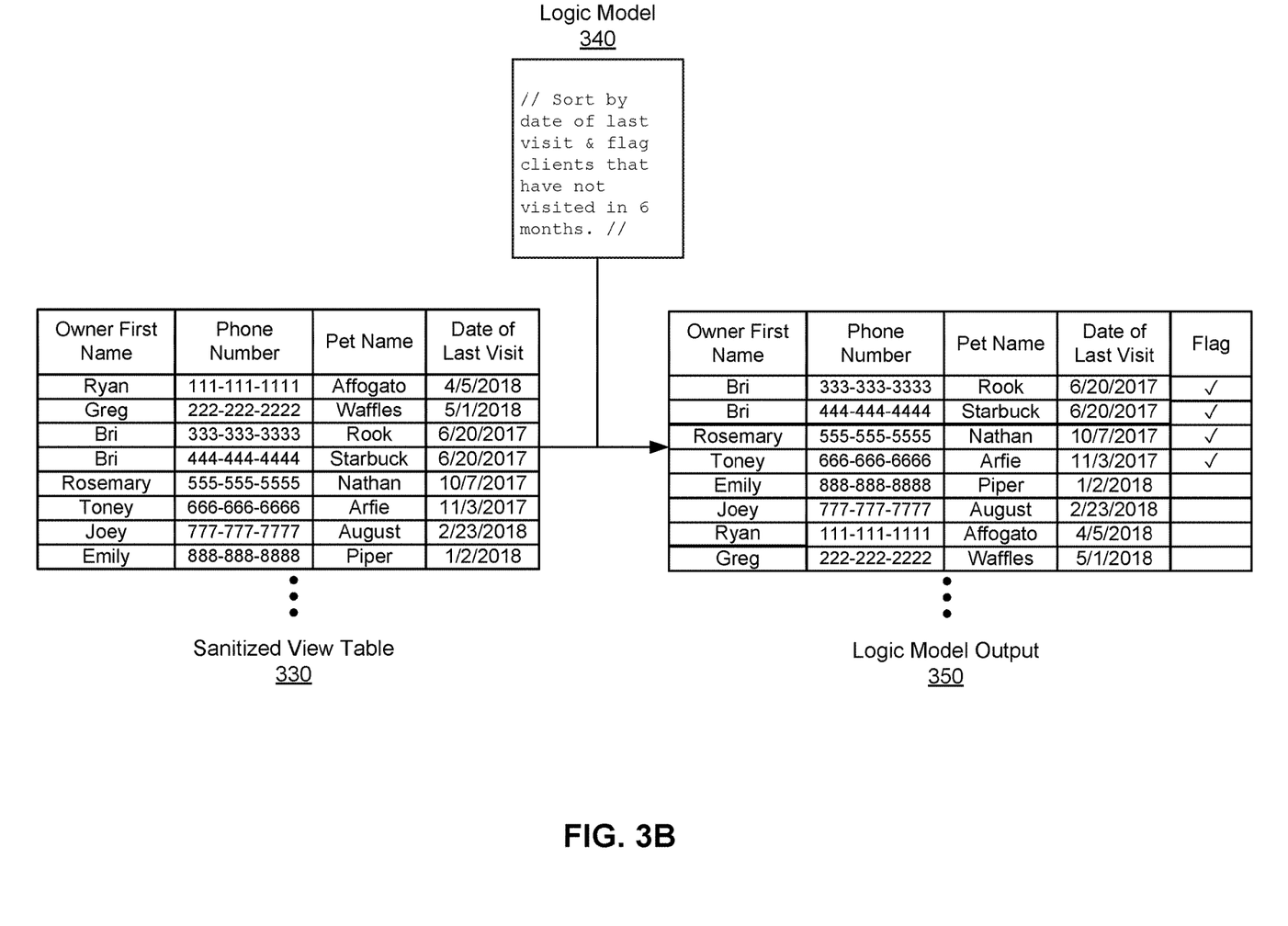

FIGS. 3A-3B illustrate an example of sanitizing a data table of a central database system and applying a logic model to the sanitized data table. A data table of the relational database 130 is identified for sanitization. The identified data table can be a table associated with a logic model being executed or tested, can be a data table flagged for sanitization (for instance, in response to the data table having not been sanitized in a threshold amount of time, in response to data within the data table being updated, and the like), or can be a data table being queried by a user of the central database system 105. In the example shown in FIG. 3A, the identified data table is represented by a view table 310. The view table 310 displays data from the identified data table organized in uniquely identified rows and columns.

The central database system 105 accesses an annotation file 320 associated with the view table 310. The annotation table 320 includes an identifier that uniquely identifies the data table represented by the view table 310 ("Table: vet_appt_list") and identifies and describes the columns included in the view table 310 ("Columns list"). As in the example shown in FIG. 3A, each column of the view table 310 is identified using a field name ("Owner First Name," "Phone Number," etc.) and described based on data type, sensitivity, and sanitization operations. For example, the "Owner First Name" field is associated with a data type "string," and is not identified as being sensitive ("sensitive: false") or as requiring sanitization ("sanitize: false"). In another example, the "Phone Number" field is associated with a data type "string," and is identified as being sensitive ("sensitive: true") and as requiring a sanitization operation based on a set replacement value ("sanitize: true; set"). In other embodiments, the annotation file 320 may include fewer or additional fields, and may identify or describe data included in the view table 310 differently.

The sanitization engine 125 accesses the annotation file 320 and the view table 310. As described in conjunction with FIGS. 1 and 2, the sanitization engine 125 implements a sanitization process on the identified view table 310 using the annotation file 320 to produce a sanitized view table 330. The organization of the data within the sanitized view table 330 is similar or identical to the organization of the data within the view table 310. For instance, the columns and number of entries within each column of the sanitized view table 330 is the same or similar to the view table 310.

The sanitization engine 125 identifies sensitive data within the view table 310 using the annotation file 320. For instance, the sanitization engine 125 identifies each column within the view table flagged as sensitive by the annotation file 320, such as the "Phone Number" column of the view table 310. The sanitization engine 125 then identifies one or more sanitization operations to perform on each sensitive column. In some embodiments, the sanitization operations include default sanitization operations (for instance, operations set by a system administrator, operations identified by organization-wide security policies, operations specific to the data table being sanitized, default operations associated with the relational database, and the like). In other embodiments, such as the embodiment of FIG. 3A, the sanitization operations are identified by the annotation file 320, for instance within the sanitization operation field associated with each column. In FIG. 3A, the annotation file 320 indicates that data within the "Phone Number" column of the view table 310 is to be replaced using a set value. For instance, the phone number data associated with the entry "Ryan" has been sanitized to display the value "111-111-1111" in the sanitized view table 330. In other examples, other sanitization operations may be used to obscure or protect sensitive data from otherwise being displayed.

As shown in FIG. 3B, a logic model 340 is applied to the sanitized view table 330. As described in conjunction with FIG. 1, the logic model 340 may include instructions for ordering data within the sanitized view table 330, altering data within the sanitized view table 330, performing one or more operations on the data within the sanitized view table, executing an application or script based on data within the sanitized view table, and other similar operations. In the example shown in FIG. 3B, the logic model includes a sorting function and a flagging function based on the "Date of Last Visit" column of the sanitized view table 330. The logic model 340 generates a logic model output 350 corresponding to the functions and instructions included in the logic model that may be accessed or used by the user of the central database system 105. For example, the logic model output 350 shown in FIG. 3B includes the data of the sanitized view table 330 sorted based on data values in the "Date of Last Visit" column. The logic model output 350 additionally adds and displays a new column "Flag" including an indicator for sets of data in the logic model output 350 meeting the criterion that the data value in the "Date of Last Visit" column is beyond a threshold value. In some embodiments, the logic model output 350 may additionally flag data in the logic model output that has undergone a sanitization operation.

Figure 4:
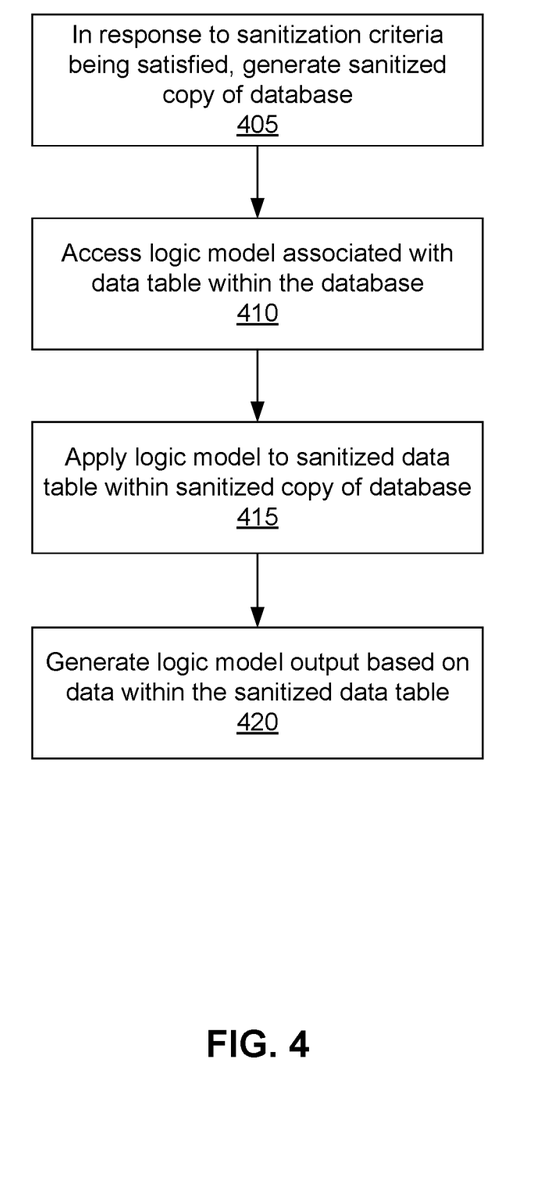
FIG. 4 is an example flowchart of a process for sanitizing a database and applying a logic model to the sanitized database, in accordance with an embodiment.

FIG. 4 is an example flowchart of a process for sanitizing a database and applying a logic model to the sanitized database. In response to one or more sanitization criteria being satisfied, the central database system 105 generates 405 a sanitized copy of the database. As previously noted, the one or more criteria may include: the passage of a threshold period of time; a request being received from a database operator, manager, or user; and an update being made to the relational database 110. The central database system 105 accesses 410 a logic model associated with a data table within the database and stored within the central database system. In one embodiment, the accessed logic models are selected or identified by users of the central database system 105, for instance a user that wants to test a software feature corresponding to the logic model before committing corresponding code to an application's code repository and implementing the feature within the application. The central database system 105 applies 415 the logic model to the sanitized data table within the sanitized copy of the database and generates 420 a logic model output based on the data within the sanitized data table. For instance, a logic model may correspond to a web portal interface that displays all employees that haven't submitted an HR form, and the logic model output may include the first names of such employees with the last names of such employees encrypted or masked.

Figure 5:
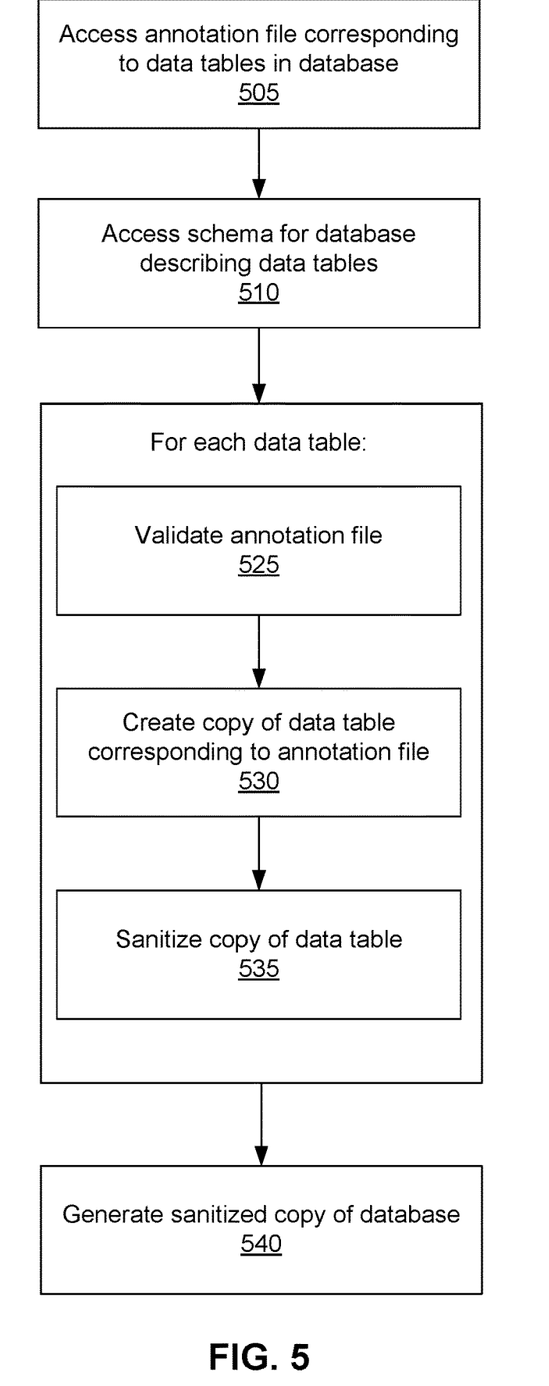
FIG. 5 is an example flowchart of a process for sanitizing a database using annotation files, in accordance with an embodiment.

FIG. 5 is an example flowchart illustrating the sanitization of a database using annotation files. In response to a decision or determination to sanitize a relational database 110, the central database system 105 accesses 505 annotation files corresponding to data tables in the relational database 110 and accesses 510 a schema for the relational database describing the data tables. For each data table in the relational database, the central database system 105 validates 525 the corresponding annotation file and, in response to the validation, creates 530 a copy of the data table corresponding to the annotation file. The central database system 105 sanitizes 535 the copy of the data table. Using the sanitized copies of the data table, the central database system 105 generates 540 a sanitized copy of the relational database 110.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for generating a sanitized copy of a relational database, comprising:
    accessing, for each of a plurality of data tables within the relational database, a corresponding annotation file, the annotation file including, for each column within the data table, one or more of a column identifier, a type of data within the column, and a sensitivity of the data within the column, wherein the annotation file includes, for each of one or more columns within the data table, an identification of a sanitization operation selected based on one or both of the type of data within the column and the sensitivity of the data within the column, the sanitization operation configured to, when performed, reduce the sensitivity of the data within the column by modifying a first type of data identified by the annotation file within the column into a second type of data identified by the annotation file;
    accessing a schema for the relational database describing a structure of the relational database;
    for each data table of the plurality of data tables, sanitizing a copy of the data table by, for each column of the data table associated with a sanitization operation within the annotation file, performing the sanitization operation on the corresponding column of the copy of the data table; and
    generating the sanitized copy of the relational database by combining the sanitized copies of data tables.

2. The computer-implemented method of claim 1, further comprising determining that each column of the data table identified by the annotation file is identified by the accessed schema.

3. The computer-implemented method of claim 1, wherein a sanitization operation included within an annotation file includes one or more of: an encryption operation, a data nil operation, an obfuscation operation, a data replacement operation, and a data randomization operation.

4. The computer-implemented method of claim 1, further comprising:
determining that a copy of each data table within the relational database is sanitized before generating the sanitized copy of the relational database.

5. The computer-implemented method of claim 1, further comprising:
prior to providing access to the sanitized copy of the relational database, validating that the sanitized copy of the relational database does not include information associated with an above-threshold level of sensitivity.

6. The computer-implemented method of claim 5, wherein validating that the sanitized copy of the relational database does not include information associated with an above-threshold level of sensitivity comprises:
identifying a data type associated with each column of the sanitized copy of the relational database; and
validating that a sanitization operation has been performed on each column of the sanitized copy of the relational database that is associated with a sensitive data type.

7. The computer-implemented method of claim 5, wherein validating that the sanitized copy of the relational database does not include information associated with an above-threshold level of sensitivity comprises:
identifying a sensitivity associated with each column of the sanitized copy of the relational database; and
validating that a sanitization operation has been performed on each column of the sanitized copy of the relational database that is associated with a threshold level of sensitivity.

8. The computer-implemented method of claim 5, wherein validating that the sanitized copy of the relational database does not include information associated with an above-threshold level of sensitivity comprises:
identifying a column that 1) includes information associated with an above-threshold level of sensitivity, and that 2) has not had a sanitization operation performed on the identified column; and
determining that the identified column is included within a column exclusions list that includes columns exempt from sanitization.

9. The computer-implemented method of claim 1, wherein the sanitized copy of the relational database is generated periodically.

10. The computer-implemented method of claim 9, wherein the sanitized copy of the relational database is generated once a day.

11. The computer-implemented method of claim 1, wherein the sanitized copy of the relational database is generated in response to a user request.

12. The computer-implemented method of claim 1, wherein the sanitized copy of the relational database is generated in response to one or more of: receiving a new annotation file, receiving an updated annotation file, receiving a domain logic model, receiving a new relational database column, and receiving an update to an existing relational database column.

13. The computer-implemented method of claim 1, further comprising:
receiving a request to execute a domain logic model on a requested data table of the relational database; and
executing the domain logic model on a sanitized data table corresponding to the requested data table within the sanitized copy of the relational database.

14. The computer-implemented method of claim 13, further comprising:
if the sanitized data table corresponding to the requested data table does not exist within the sanitized copy of the relational database, blocking the execution of the domain logic model until the sanitized data table is generated.

15. The computer-implemented method of claim 13, further comprising:
if the sanitized data table corresponding to the requested data table is included within the sanitized copy of the relational database but has not been updated in over a threshold amount of time, blocking the execution of the domain logic model until the sanitized data table is updated.

16. The computer-implemented method of claim 13, further comprising:
if the sanitized data table corresponding to the requested data table is included within the sanitized copy of the relational database, but data within the requested data table has been updated or altered since the sanitized data table was generated, blocking the execution of the domain logic model until the sanitized data table is updated.

17. The computer-implemented method of claim 1, further comprising:
for each request to access a data table of the sanitized copy of the relational database, generating an audit document identifying the data table, identifying a user associated with the request to access the data table, and identifying a domain logic model associated with the request.

18. The computer-implemented method of claim 1, wherein the plurality of data tables includes less than all data tables within the relational database, and wherein the plurality of data tables comprise data tables identified as most likely to be accessed, data tables queried by a user or process, and data tables corresponding to a set of logic models being tested.

19. A system, comprising:
a non-transitory computer-readable storage medium storing executable instructions that, when executed by a processor, cause the system to perform steps comprising:
accessing, for each of a plurality of data tables within a relational database, a corresponding annotation file, the annotation file including, for each column within the data table, one or more of a column identifier, a type of data within the column, and a sensitivity of the data within the column, wherein the annotation file includes, for each of one or more columns within the data table, an identification of a sanitization operation selected based on one or both of the type of data within the column and the sensitivity of the data within the column, the sanitization operation configured to, when performed, reduce the sensitivity of the data within the column by modifying a first type of data identified by the annotation file within the column into a second type of data identified by the annotation file;
accessing a schema for the relational database describing a structure of the relational database;
for each data table of the plurality of data tables, sanitizing a copy of the data table by, for each column of the data table associated with a sanitization operation within the annotation file, performing the sanitization operation on the corresponding column of the copy of the data table; and generating a sanitized copy of the relational database by combining the sanitized copies of data tables; and a processor configured to execute the instructions.

20. A non-transitory computer-readable storage medium storing executable instructions that, when executed by a processor, cause the processor to perform steps comprising:

accessing, for each of a plurality of data tables within a relational database, a corresponding annotation file, the annotation file including, for each column within the data table, one or more of a column identifier, a type of data within the column, and a sensitivity of the data within the column, wherein the annotation file includes, for each of one or more columns within the data table, an identification of a sanitization operation selected based on one or both of the type of data within the column and the sensitivity of the data within the column, the sanitization operation configured to, when performed, reduce the sensitivity of the data within the column by modifying a first type of data identified by the annotation file within the column into a second type of data identified by the annotation file;

accessing a schema for the relational database describing a structure of the relational database;

for each data table of the plurality of data tables, sanitizing a copy of the data table by, for each column of the data table associated with a sanitization operation within the annotation file, performing the sanitization operation on the corresponding column of the copy of the data table; and generating a sanitized copy of the relational database by combining the sanitized copies of data tables.

* * * * *